United States Patent
Salter et al.

(10) Patent No.: US 11,377,038 B2
(45) Date of Patent: Jul. 5, 2022

(54) VEHICLE DOOR STORAGE SYSTEM AND DOOR STORAGE METHOD

(71) Applicant: Ford Global Technologies, LLC, Dearborn, MI (US)

(72) Inventors: Stuart C. Salter, White Lake, MI (US); James Baumbick, Northville, MI (US); Annette Lynn Huebner, Highland, MI (US); David Brian Glickman, Southfield, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 17/021,749

(22) Filed: Sep. 15, 2020

(65) Prior Publication Data

US 2022/0080894 A1     Mar. 17, 2022

(51) Int. Cl.
*B60R 5/04*     (2006.01)
*B60J 5/04*     (2006.01)

(52) U.S. Cl.
CPC .............. *B60R 5/045* (2013.01); *B60J 5/0487* (2013.01)

(58) Field of Classification Search
CPC ........... B60R 5/044; B60R 5/045; B60R 5/04; B60R 5/041; B60J 5/0486; B60J 5/0476; B60J 5/0487; B60J 7/20; B60J 7/207
USPC ................................................ 296/37.5, 147
See application file for complete search history.

(56) References Cited

U.S. PATENT DOCUMENTS

| | | | | |
|---|---|---|---|---|
| 3,004,790 A | * | 10/1961 | Mayer | B60R 5/041 296/26.09 |
| 4,467,944 A | * | 8/1984 | Manko | B60J 7/20 224/311 |
| 6,889,881 B2 | * | 5/2005 | Wilkens | B60R 9/065 224/509 |
| 6,926,330 B2 | * | 8/2005 | Scholz | B60J 7/106 296/218 |
| 7,201,421 B2 | * | 4/2007 | Reynolds | B60R 7/02 224/400 |
| 7,275,670 B1 | | 10/2007 | Shumack et al. | |
| 7,469,948 B2 | * | 12/2008 | Karuppaswamy | B60R 5/041 296/26.01 |
| 7,591,504 B1 | | 9/2009 | Schrader | |
| 8,408,623 B1 | | 4/2013 | McAuliff | |
| 10,399,486 B2 | | 9/2019 | Salter et al. | |
| 2004/0160076 A1 | * | 8/2004 | Masuda | B66F 7/065 296/37.3 |
| 2015/0224860 A1 | * | 8/2015 | Bowles | B60J 7/0435 296/218 |

(Continued)

FOREIGN PATENT DOCUMENTS

| | | | | |
|---|---|---|---|---|
| DE | 102012019285 A1 | * | 3/2013 | ............... B60R 7/02 |
| JP | 2014083858 | | 5/2014 | |
| WO | WO-2017036910 A2 | * | 3/2017 | ............... B60R 5/04 |

*Primary Examiner* — D Glenn Dayoan
*Assistant Examiner* — Kevin P Weldon
(74) *Attorney, Agent, or Firm* — Vichit Chea; Carlson, Gaskey & Olds, P.C.

(57) ABSTRACT

A vehicle assembly includes, among other things, a door storage system that is disposed within a cargo area of a vehicle. The door storage system is moveable between a lowered position and an expanded position. The door storage system is configured to accept at least one door of the vehicle within a door receiving area when the door storage system is in the expanded position.

18 Claims, 7 Drawing Sheets

(56) References Cited

U.S. PATENT DOCUMENTS

2019/0160922 A1* 5/2019 Hagedorn .............. B60J 5/0486
2019/0337365 A1* 11/2019 Marchetti .............. B60J 5/0486
2019/0366967 A1* 12/2019 Faruque ............ B60R 21/23138

* cited by examiner

VEHICLE DOOR STORAGE SYSTEM AND DOOR STORAGE METHOD

TECHNICAL FIELD

This disclosure relates generally to vehicle doors and, more particularly, to storing vehicle doors.

BACKGROUND

Some vehicles, especially vehicles designed for off-road use, include doors that can be removed. The vehicle can be operated with the doors removed to provide the driver and passengers with an open air driving experience.

SUMMARY

A vehicle assembly according to an exemplary aspect of the present disclosure includes, among other things, a door storage system that is disposed within a cargo area of a vehicle. The door storage system is moveable between a lowered position and an expanded position. The door storage system is configured to accept a door of the vehicle within a door receiving area when the door storage system is in the expanded position.

Another example of the foregoing vehicle assembly includes an upper platform of the door storage system. The upper platform is vertically higher when the door storage system is in the expanded position than when the door storage system is in the lowered position.

In another example of any of the foregoing vehicle assemblies, the upper platform of the door storage system is vertically beneath a beltline of the vehicle when the door storage system is in the expanded position.

In another example of any of the foregoing vehicle assemblies, the door receiving area is vertically beneath the upper platform when the door storage system is in the expanded position.

Another example of any of the foregoing vehicle assemblies includes a support panel of the door storage system. The support panel is pivotable between a stowed position and a flipped position. The support panel provides a lateral side of the door storage system when the door storage system is in the flipped position.

In another example of any of the foregoing vehicle assemblies, the support panel includes a hinged side and a leading edge that is opposite the hinged side. The leading edge supports the upper platform when the door storage system is in the expanded position.

Another example of any of the foregoing vehicle assemblies includes a first door and a second door. The system further includes at least one spacer configured to be placed vertically between the first and second door when the first and second door are disposed within the door receiving area.

Another example of any of the foregoing vehicle assemblies includes a floor of the door storage system. The floor has a profile mimicking a profile of a side of the first door.

Another example of any of the foregoing vehicle assemblies includes at least one support panel of the door storage system. The support panel is pivotable between a stowed position and a flipped position. The support panel provides a lateral side of the door storage system when the door storage system is in the flipped position. The spacer is pivotably connected to the at least one support panel.

In another example of any of the foregoing vehicle assemblies, the door is a side door of the vehicle.

In another example of any of the foregoing vehicle assemblies, the vehicle comprises no more than two side doors.

Another example of any of the foregoing vehicle assemblies includes a first side door and a second side door that are disposed on an inboard or outboard side and are stacked vertically atop one another.

In another example of any of the foregoing vehicle assemblies, the first side door and the second side door each include a locator configured to communicate with a communication module on the vehicle when the respective first or second side door is decoupled from the vehicle.

In another example of any of the foregoing vehicle assemblies, the door storage system is slidable between a stowed position and a loading position. A rear door of the vehicle can close when door storage system is in the stowed position. The door storage system is extended at least partially rearward of the rear bumper when in the loading position.

In another example of any of the foregoing vehicle assemblies, the door storage system includes an upper platform, a floor, a driver side support panel pivotably secured to the floor, and a passenger side support panel pivotably secured to the floor. The upper platform, floor, driver and passenger side support panels are slidable together between the stowed position and the loading position.

In another example of any of the foregoing vehicle assemblies, the upper platform includes at least one recessed area configured to receive a traction device.

A method of removing and storing a door of a vehicle according to another exemplary aspect of the present disclosure includes, among other things, transitioning a door storage system of a vehicle from a lowered position to an expanded position, and loading a door within a door receiving area of the door storage system when the door storage system is in the expanded position.

Another example of the foregoing method includes, prior to the loading, sliding the door storage system from a stowed position to a loading position, and loading the door when the door storage system is in the loading position.

Another example of any of the foregoing methods includes stacking a first side door atop a second side door during the loading, and separating the first side door from the second side door using at least one spacer.

Another example of any of the foregoing methods includes, after the loading, covering the at least one door with an upper platform of the door storage system.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to storing doors of a vehicle. More particularly, this disclosure relates to storing doors of a vehicle within the vehicle while the vehicle is operated without doors in an installed position. A user of the vehicle may wish to operate the vehicle without doors in the installed position to provide the user with an open-air driving experience. Since the doors are stored within the vehicle, retrieving the doors to mount them back in the installed position is relatively straightforward.

Figure 1:
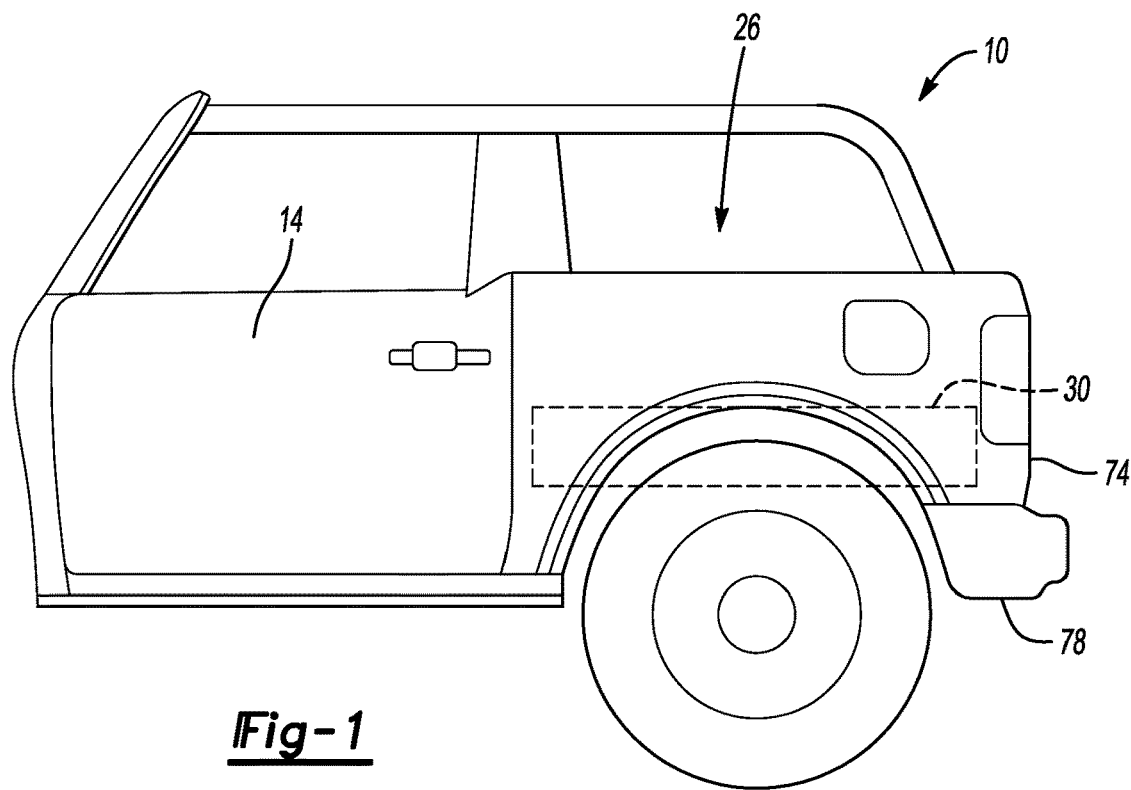
FIG. 1 illustrates a side view of a vehicle having at least one door and a door storage system according to an exemplary aspect of the present disclosure.
Figure 2:
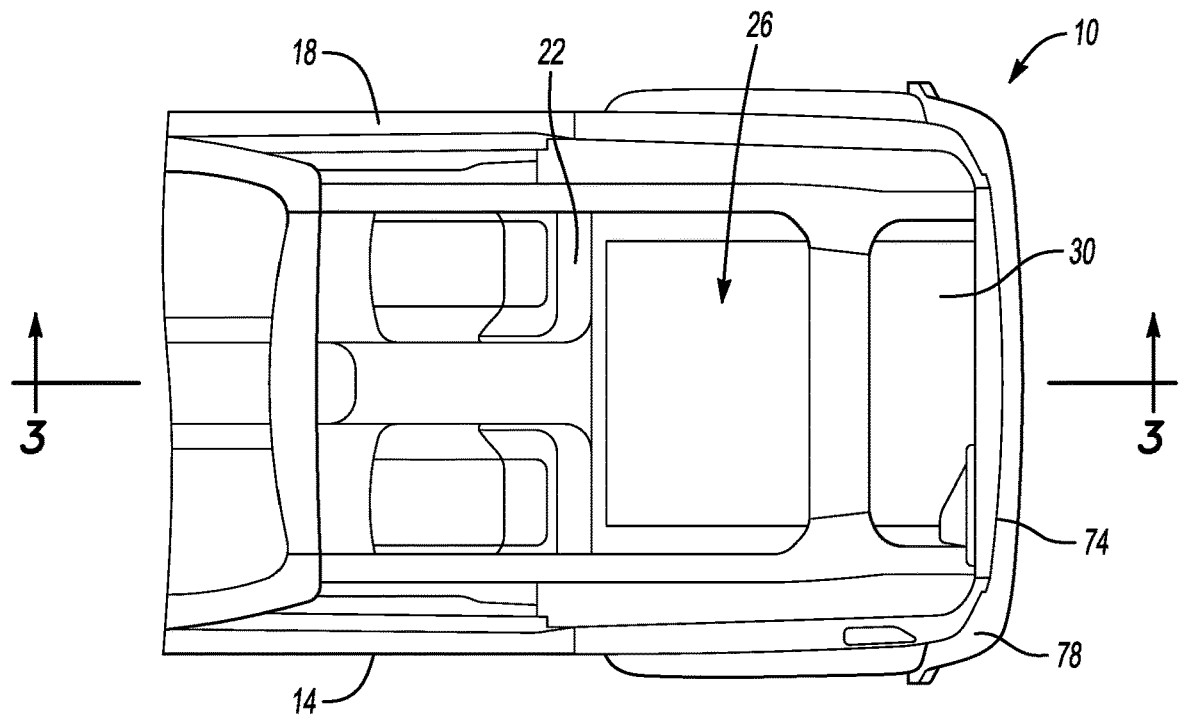
FIG. 2 illustrates a top view of the vehicle shown in FIG. 1.

Referring to FIGS. 1 and 2, an exemplary vehicle 10 includes doors 14 and 18, which are shown in an installed position. The door 14 is a driver side door. The door 18 is a passenger side door.

The vehicle 10 is an off-road vehicle and can be characterized as a two-door vehicle as it includes two side doors and a single row of seats 22. Aft of the seats 22 is a cargo area 26. The cargo area 26 can hold various types of cargo for transport by the vehicle 10.

Figure 3:
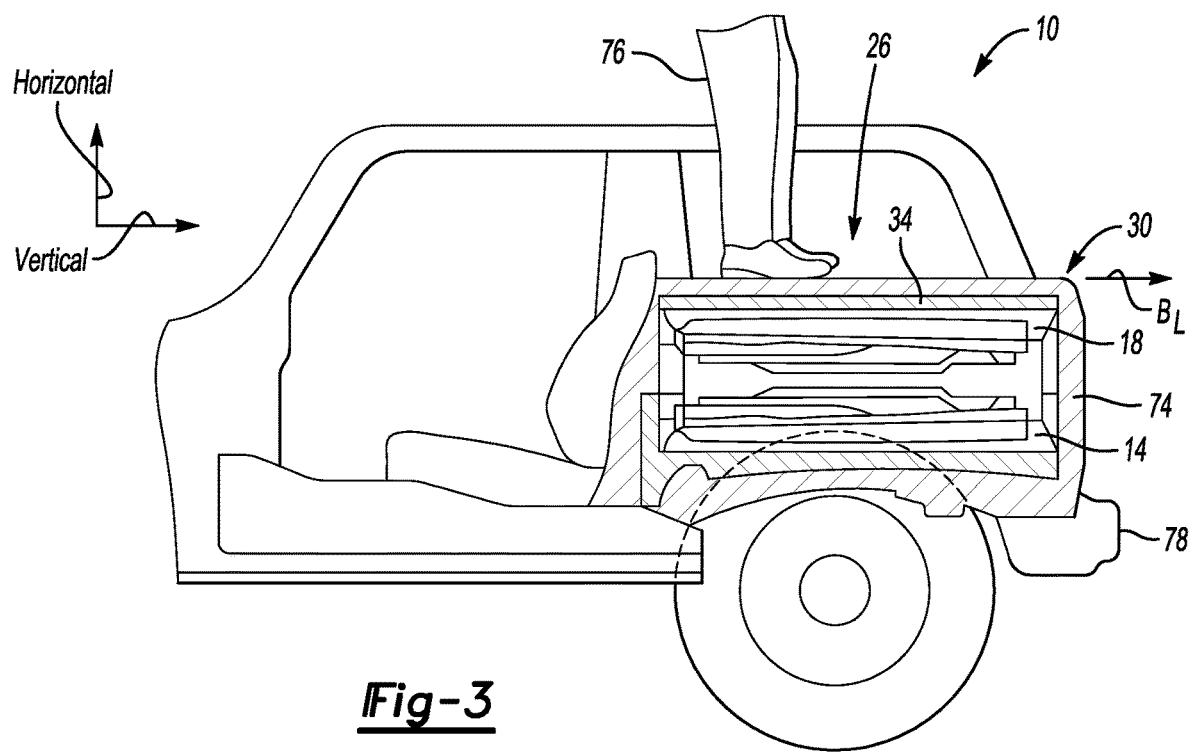
FIG. 3 illustrates a section view taken at line 3-3 in FIG. 2 showing the doors after being removed from an installed position on the vehicle and stored within the door storage system.

From time to time, a user may wish to operate the vehicle 10 without the doors 14, 18 in the installed position. To store the doors 14, 18 after removing them from the installed position, the exemplary vehicle 10 includes a door storage system 30 that can be disposed within the cargo area 26. When storing doors, the door storage system 30 is in an expanded position as shown in FIG. 3. When not storing doors, the door storage system 30 can be maintained in a lowered position as shown in FIGS. 1 and 2, which can increase space within the cargo area 26 for storing items other than the doors 14, 18. If desired, the door storage system 30 can be maintained in the expanded position of FIG. 3 without storing any doors.

As desired, the user can remove the doors 14, 18 from the installed position of FIGS. 1 and 2 and store the doors 14, 18 within the door storage system 30. The vehicle 10 can then be operated while carrying the doors 14, 18 in the door storage system 30. If the user desires to move the doors 14, 18 back to the installed position, the user can retrieve the doors 14, 18 from the door storage system 30.

Figure 4:
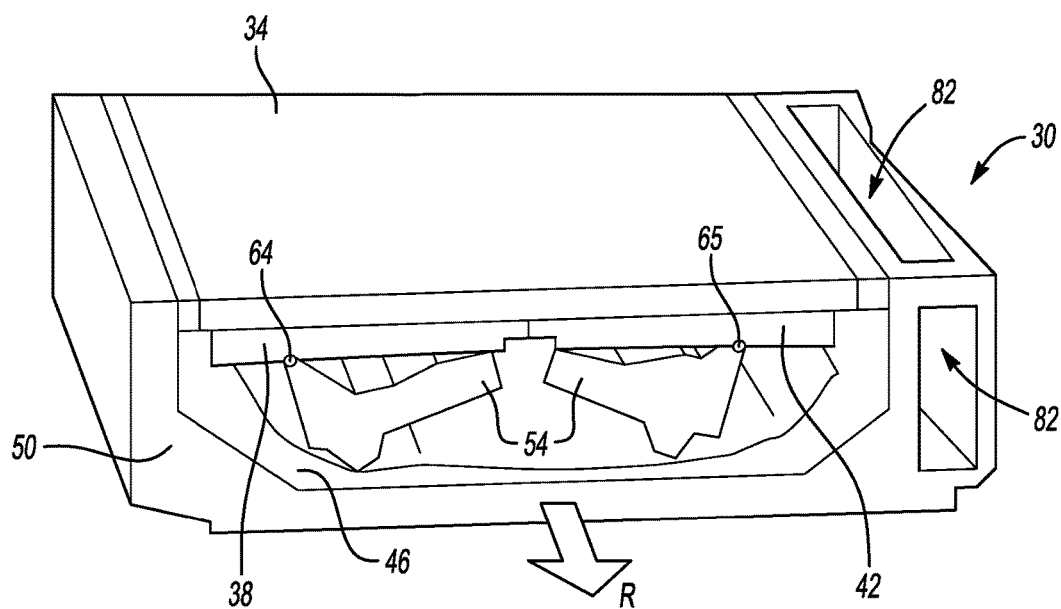
FIG. 4 illustrates a perspective view of the door storage system in a lowered position and stowed position with other portions of the vehicle not shown.

FIG. 4 shows a perspective view of the door storage system 30 in a vertically lowered position and a horizontally stowed position. Generally, the door storage system 30 includes an upper platform 34, a driver side support panel 38, a passenger side support panel 42, a floor 46, a base 50, and at least one spacer 54. Two spacers 54 are shown in the exemplary embodiment. In other examples, a single spacer or more than two spacers could be used. The spacers 54 or spacer can have negative surfaces that align with positive surfaces of the door 14 or 18. In such an example, the surface spacer 54 mimics the surface of the door 14 or 18. This can help to hold the doors 14 and 18 firmly and can reduce the potential for slip.

The support panel 38 includes a hinged side 58 and a support side 62 that is opposite the hinged side 58. The hinged side 58 is hinged to the floor 46, which permits the support panel 38 to pivot from back and forth between the flat position of FIG. 4 and the flipped or upright position of FIG. 5. The support panel 42 is similarly configured.

In the exemplary embodiment, one of the spacers 54 is connected to the driver side support panel 38 at with a hinge 64. The other one of the spacers 54 is secured to the passenger side support panel 42 with a hinge 65. In other examples, the spacers 54 are not connected to either of the panels 38, 42 and instead are separate structures that can be removed from the vehicle 10 without requiring them to be disconnected. Hinging the spacers 54 to the support panel 38 or 42 can help to ensure, however, that the spacers 54 are not misplaced and remain available when storing the doors 14, 18 is required.

Figure 5:
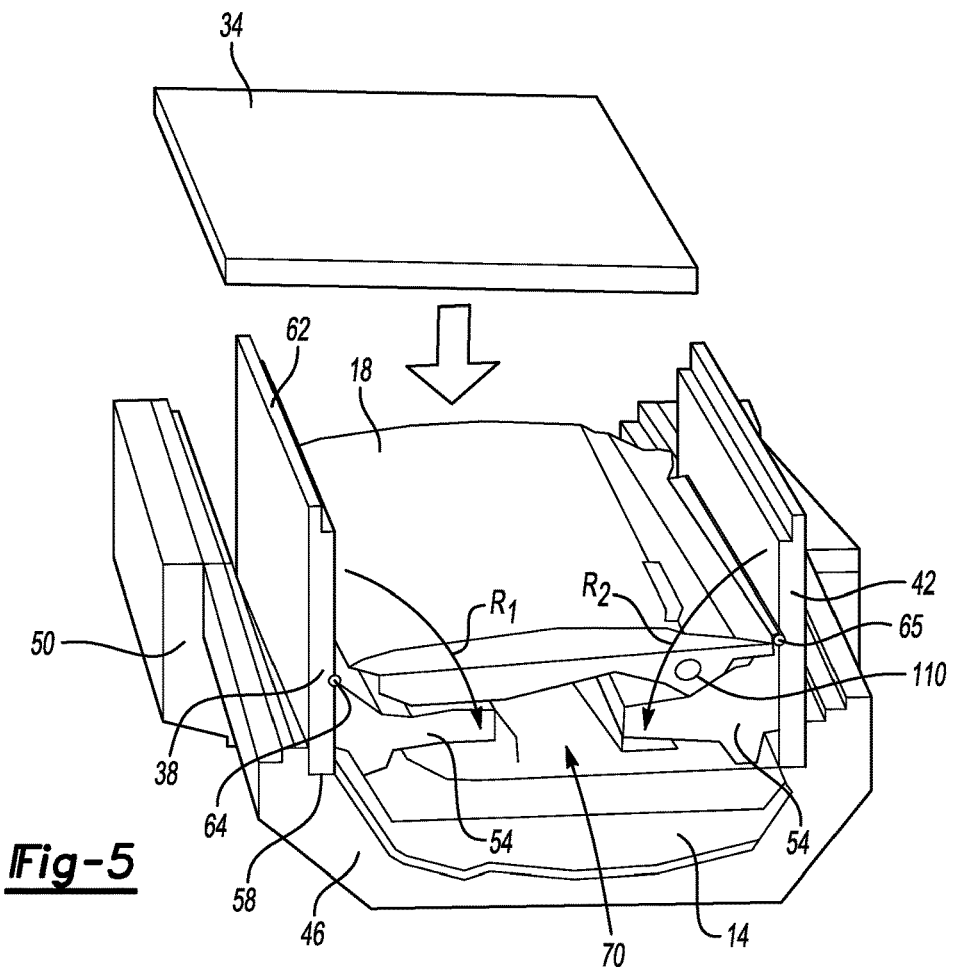
FIG. 5 illustrates the door storage system of FIG. 4 after transitioning from the stowed position to a loading position and after receiving doors of the vehicle.

In the exemplary embodiment, storing the doors 14, 18 within the door storage system 30 begins by sliding the floor 46, the support panels 38, 42, and the upper platform 34 horizontally from the stowed position of FIG. 4 to the extended or loading position of FIG. 5. The sliding is in the direction R, which is rearward relative to the base 50 and the remaining portions of the vehicle 10. The floor 46 and support panels 38, 42 slide together relative to the base 50 when moving to the loading position. The floor 46 can slidably couple to the base 50 through rails that facilitate the sliding.

Once in the loading position, the user can remove the upper platform 34 and then flip the support panels 38, 42 to the upright positions to establish a door receiving area 70. Next, the door 14 is then placed on its outboard side against the floor 46 within the door receiving area 70. In the exemplary embodiment, the floor 46 has a surface profile 72 that matches or mimics the outboard side of the door 14. This facilitates nesting the door 14 within the floor 46, which can, among other things, reduce the overall packaging area required to accommodate the door 14.

The spacers 54 are then rotated in directions R1 and R2 to the position shown in FIG. 5 where the spacers 54 rest on top of the door 14. Next, the door 18 is stacked on top of the spacers 54. In this example, the in-board side of the door 18 is placed against the spacers 54. The spacers 54 can be primarily foam and can include molded-in features corresponding to features on inboard sides of the doors 14, 18. This can help to align the doors 14, 18 within the door receiving area 70. The spacers 54 can also keep the door 18 spaced from the door 14 within the door receiving area 70, which can help to prevent damage due to the doors 14, 18 jostling and contacting one another.

After placing the doors 14, 18 and the spacers 54 within the door receiving area 70, the upper platform 34 can then be supported on the support side 62 of the support panel 38 and the support side of the support panel 42 such that the upper platform 34 spans from the support panel 38 to the support panel 42. The support side 62 can include a groove or other features configured to mesh with corresponding features on the upper platform 34 to facilitate alignment between the upper platform 34 and the support side 62. The support side of the support panel 42 can be similarly configured. When the door storage system 30 is in the expanded position, a door receiving area 70 is provided vertically beneath the upper platform 34.

Figure 6:
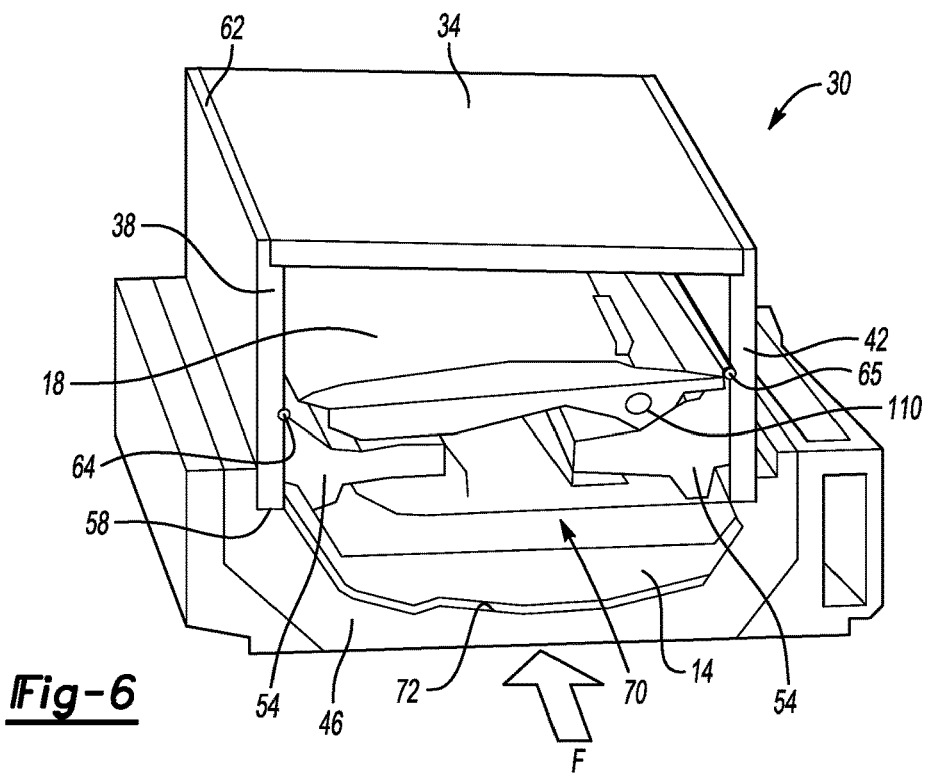
FIG. 6 illustrates the door storage system of FIGS. 4 and 5 after transitioning from the loading position of FIG. 5 back to a stowed position.

The floor 46, support panels 38, 42, upper platform 34, along with the doors 14, 18 and spacers 54 are then slid forward in a direction F from loading position of FIG. 5 to a stowed position shown in FIG. 6. A rear door 74 (FIG. 3) of the vehicle 10 can then be closed to contain the door storage system 30 and the doors 14, 18 within the cargo area 26. In the exemplary embodiment, the rear door 74 can move to the closed position of FIGS. 1-3 when the door storage system 30 is in the stowed position, not when the door storage system 30 is in the loading position. When the door storage system 30 is in the loading position, the door storage system 30 extends at least partially rearward of a rear bumper 78 of the vehicle.

When the support panel 38, 42 are flipped vertically upward and supporting the upper platform 34, the door storage system 30 is considered to be in an expanded position. When the support panels 38, 42 are folded inward and are aligned horizontally, the door storage system 30 is considered to be in a lowered position. Notably, the spacers 54 are storable vertically beneath the support panels 38, 42 when the door storage system 30 is in the lowered position. The pivotability of the spacers 54 can facilitate flipping the spacers 54 into the stored position. The door storage system 30 can extend and retract between the loading position and the stowed position when the door storage system 30 is in the lowered position. The door storage system 30 can extend and retract between the loading position and the stowed position when the door storage system 30 is in the expanded position.

The support panels 38, 42, and upper platform 34 can be structural foam, which can be relatively lightweight when compared to other materials. The upper platform 34 in particular may be reinforced with a metal or polymer-based reinforcement to provide added strength.

As can be appreciated, the upper platform 34 is vertically higher when the door storage system 30 is in the expanded position of FIGS. 3 and 6 than when the door storage system 30 is in the lowered position of FIG. 4. Vertical and horizontal are, for purposes of this disclosure, with reference to the general orientation of the vehicle 10 during ordinary operation and with respect to ground or horizon.

When the door storage system 30 is in the expanded position, the upper platform 34 may provide a convenient spot for an individual 76 to stand while the vehicle 10 is stationary (see FIG. 3). When the door storage system 30 is in the expanded position, the individual 66 may want to stand on the upper platform 34 to observe, for example, a sporting event at a race track.

Notably, although the upper platform 34 is elevated when the door storage system 30 is in the expanded position, the upper platform 34 is still vertically below a beltline BL of the vehicle 10. Thus, an individual viewing a side of the vehicle 10 would not readily be able to visually perceive the upper platform 34 because the upper platform 34 would be hidden behind sidewalls of the vehicle 10.

As can be appreciated, the door storage system 30 in the extended position provides the user with better access during loading of the doors 14, 18 into the door receiving area 70. The door storage system 30 being moveable to the extended position is not required, however. In another example, the door storage system 30 could be configured such that the door storage system 30 does not slide and is contained within the cargo area 26 when loading and unloading the doors 14, 18.

The door storage system 30, in the exemplary embodiment, is spaced laterally somewhat from a passenger side of the vehicle 10. This provides openings 82 (FIG. 4) within the cargo area 26 of the vehicle 10. These openings 82 can be accessed by a user whether the door storage system 30 is in the lowered position or the expanded position. The user can store various items within the openings 82.

In some examples, the door storage system 30 is transitioned into the expanded position but the doors 14, 18 are left in an installed position on the vehicle 10. The door receiving area 70 can then provide an additional storage area. The door receiving area 70 can provide hidden and secure storage as can be appreciated.

Figure 7:
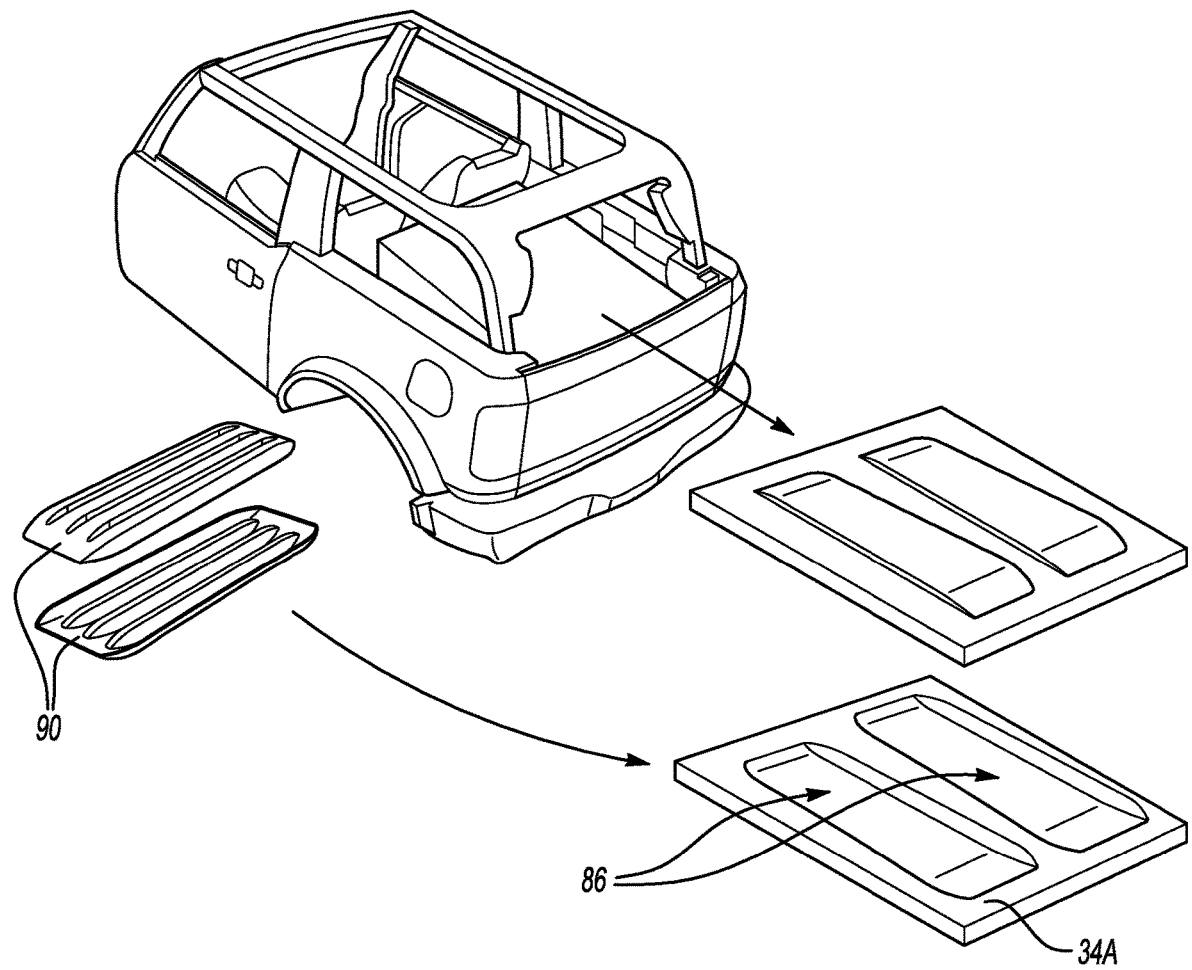
FIG. 7 illustrates a door storage system having an upper platform according to another exemplary aspect of the present disclosure.

Another example upper platform 34A is shown in FIG. 7. The upper platform 34A includes two recessed areas 86. Each recessed area 86 can receive and store a traction device, here, a traction board 90. In another example, the traction device could be a traction mat, for example. The upper platform 34A could have recessed areas 86 designed to hold other items instead of, or in addition to, the traction boards 90.

Figure 8:
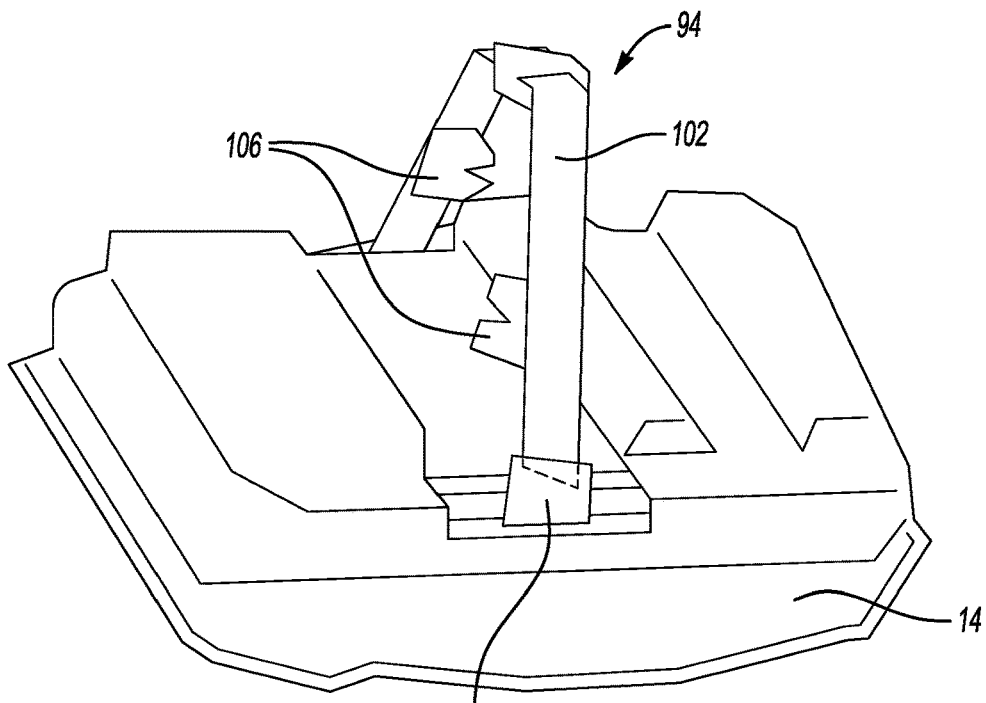
FIG. 8 illustrates a carrying assembly coupled to one of the doors of the vehicle.
Figure 9A:
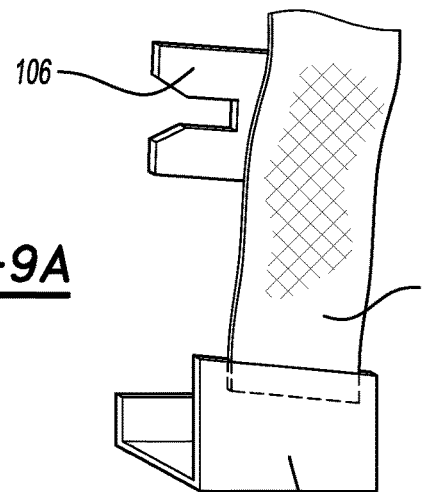
FIG. 9A illustrates a close-up view of a portion of the carrying assembly.

With reference now to FIGS. 8 and 9A, the vehicle 10 may come equipped with a carrying assembly 94 that can be utilized by the user to assist when moving the doors 14, 18. The carrying assembly 94, in the exemplary embodiment, include hooks 98 joined to opposite ends of a strap 102. The hooks 98 can be coupled to a forward side and a rear side of a door, here the door 14 when an inboard side of the door 14 is facing upward.

Figure 9:
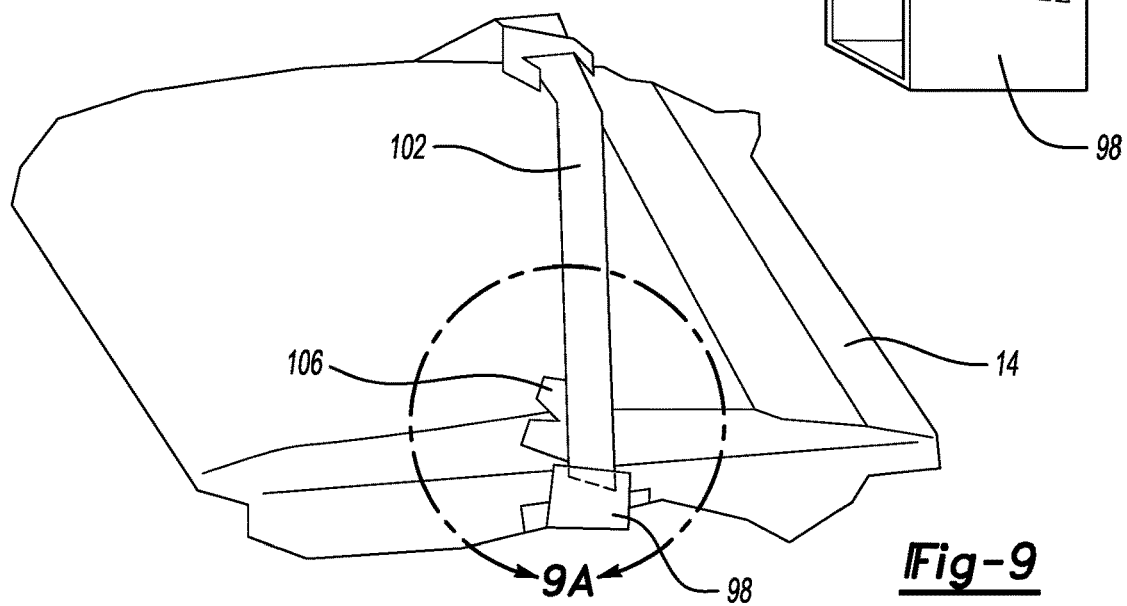
FIG. 9 illustrates the carrying assembly coupled to the door of FIG. 8 in another position.

Also secured to the strap 102 are a pair of hem flange grippers 106. The grippers 106 are spaced a distance from the hook 98. The grippers 106 can be used to clip on a hem flange of the door 14 after the door 14 is flipped from the position of FIG. 8 to the position of FIG. 9. Clipping the grippers 106 to the hem flange of the door 14 helps protect the edge of the door 14 and to stabilize the carrying assembly 94. The carrying assembly 94 may further include a slipover grip and load distributor. After securing the carrying assembly 94 to the door 14, the user can use the carrying assembly 94 to help transport the door 14 to or from the door storage system 30, or to or from some other area.

Figure 10:
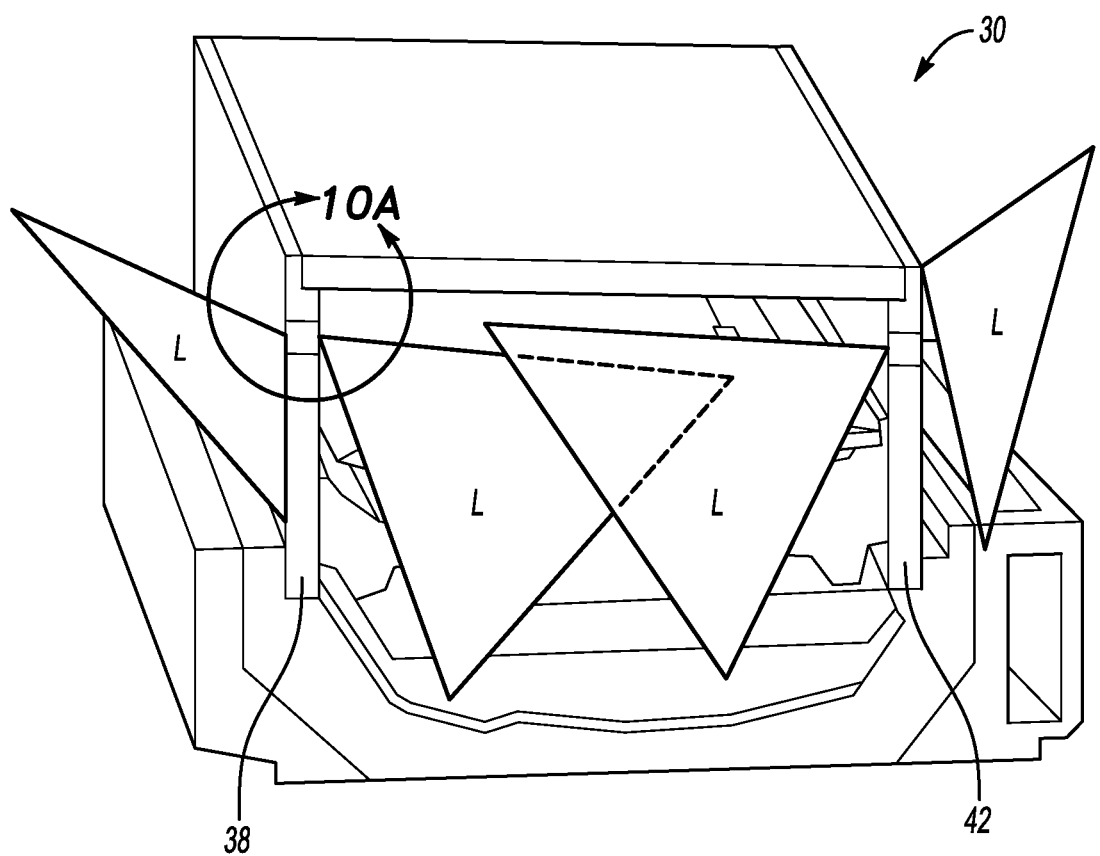
FIG. 10 illustrates the door storage system in the position of FIG. 6 with lighting devices illuminating areas of the door storage system and surrounding areas.
Figure 10A:
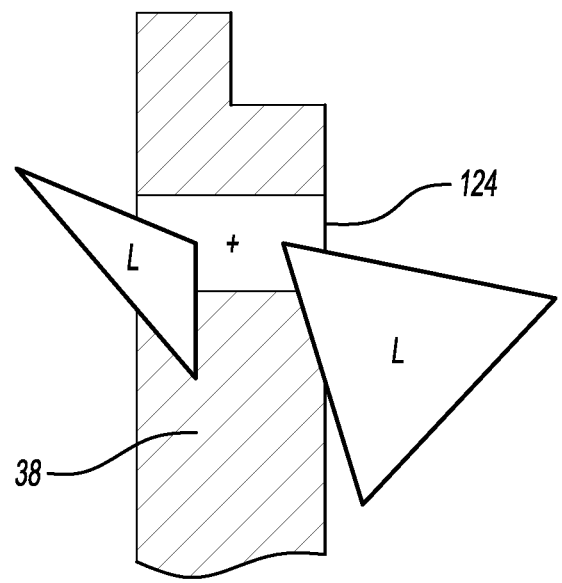
FIG. 10A illustrates a close-up section view of an area of a support panel of FIG. 10.

With reference now to FIGS. 10-10A, the door storage system 30 can include lights 124 that illuminate various areas of the vehicle 10 and areas surrounding the vehicle 10. The lights 124 are included in the support panels 38, 42 in this example. The lights 124 can include printed circuit boards within plastic shells. The printed circuit boards can incorporate wires that are soldered directly in and are conformal coated for water resistance.

The lights 124 can directed to provide a wash of light L across the support panels 38, 42 and the surrounding areas. The lights 124 can be used in connection with an orientation sensor that can sense whether the support panel 38 or 42 is upright or folded down. The lights 124 could be controlled such that the lights 124 are only active when the respective support panel 38, 42 is upright.

The doors 14, 18 in the exemplary embodiment are equipped with a tracker device 110 (FIG. 5). The tracker device 110 can be, for example, a Bluetooth low energy (BLE) tag.

The vehicle 10 can include interior or exterior BLE antennas configured to communicate with the tracker device 110. The vehicle 10, using the antennas, can triangulate on the position of the tracker device 110 and thus the position of the doors 14, 18.

In an example, the vehicle 10 communicate with the tracker device 110 during a startup of the vehicle 10. This can reveal a position of the doors 14, 18 to a control module of the vehicle. If the doors 14, 18 are in an undesirable location, the controller may issue an alarm or other notification to a user. The alarm or notification may also issue in response to detecting that the doors 14, 18 have been removed from the cargo area 26.

Figure 11:
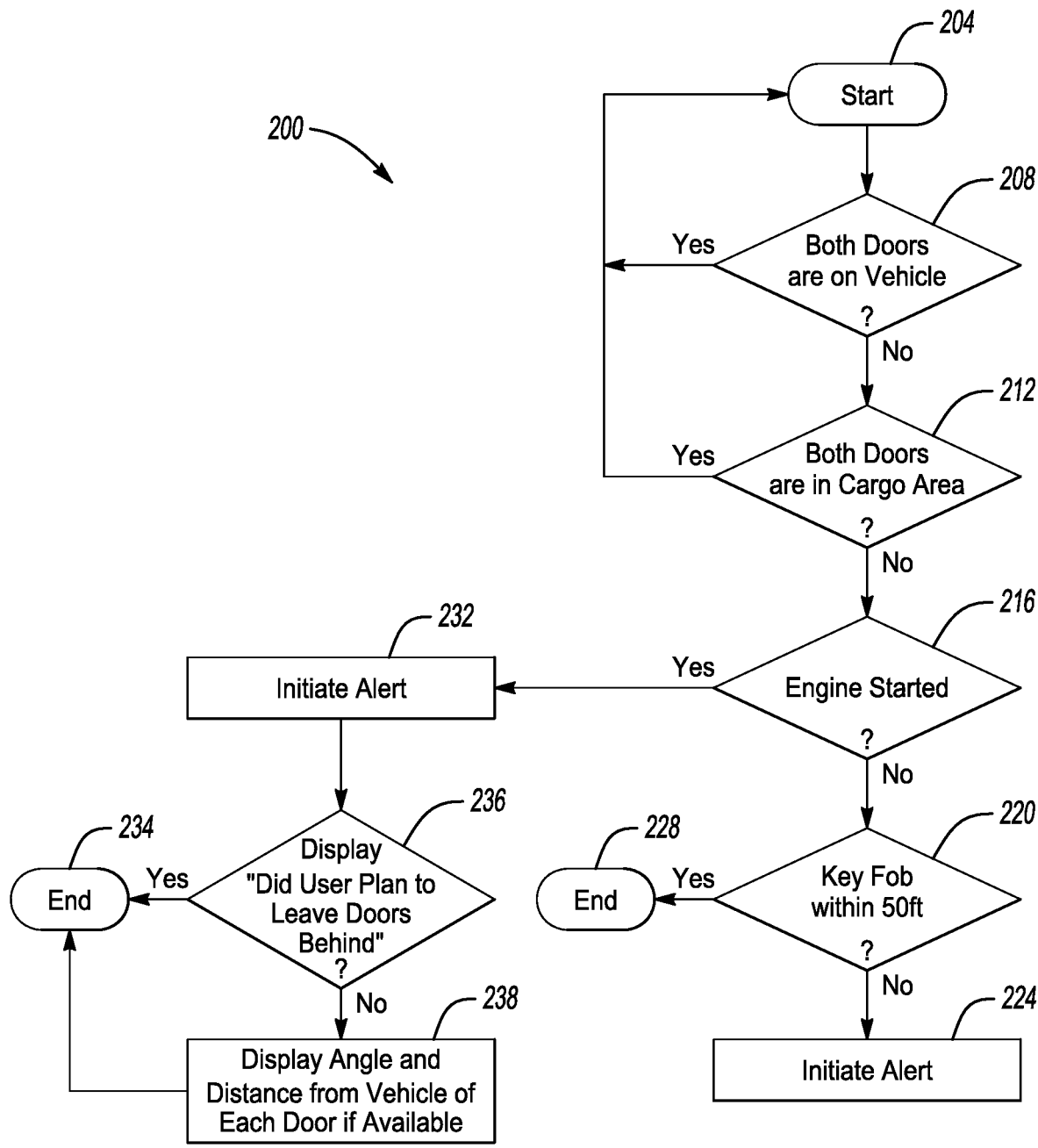
FIG. 11 illustrates a flow of an example method of monitoring a position of the doors of the vehicle of FIGS. 1-3.

A flow of an example method 200 of monitoring the position of the doors 14, 18 is shown in FIG. 11. The method 200 begins at a start step 204. Next, at a step 208, the method 200 determines whether the doors 14, 18 are on the vehicle 10. If yes, the method 200 returns to the start 204. The step 208 may rely on the tracker device 110 to assess whether the doors 14, 18 are on the vehicle 10, or may attempt to communicate with a window switch of the doors 14, 18, for example.

If the doors 14, 18 are not on the vehicle at the step 208, the method 200 moves from the step 208 to the step 212, which assesses whether or not the doors 14, 18 are in the cargo area 26 at a rear of the vehicle 10. If yes, the method 200 returns to the start 204.

If the doors 14, 18 are not in the cargo area 26 at the step 212, the method 200 moves from the step 212 to the step 216, which assesses whether or not an engine or drive cycle of the vehicle 10 has started. If not, the method 200 moves to a step 220 and assesses whether or not the a keyfob or other identifier associated with a user is within a set distance of the vehicle 10, say fifty feet, at the step 220. If the user cannot be located within the set distance, the method 200 moves to the step 224 where the doors 14, 18 are interpreted as being stolen. At the step 224, the method 200 initiates an alert, which can include, for example, starting a vehicle theft alarm and sending video to a smartphone of the user. A video could be sent to the owner's smartphone of the time period where the doors 14, 18 were likely removed. If the user is located within the set distance at the step 220, the method 200 ends at the step 228.

If at step 216 the car engine has started, an alert is displayed at a step 232 that the doors 14, 18 have not been located. The alert could be a displayed on a touchscreen, could be an audible alert, or both.

From the step 232, the method 200 moves to step 236, which asks the user to confirm whether or not the doors 14, 18 were intended to be left behind. If a response from the user indicates that the user wanted the doors 14, 18 left behind, the method 200 moves to the step 234 and ends. If a response from the user indicates that the doors 14, 18 should not be left behind, the method 200 moves the step 238 and displays a location of the doors 14, 18 if possible. The location may be revealed as an angle and distance from the vehicle 10.

Features of the disclosed examples include a door storage system that can employ relatively lightweight technologies, such as structural foam to facilitate one person or two person use. The contoured design of the door storage area can help facilitate an aftermarket installation without requiring drilling or substantial modifications. Noise vibration and harshness performance can be improved by the inclusion of the door storage system even if the door storage system is not utilized to store doors.

In examples, all the accessories for door storage can be contained within the vehicle. The door storage system, with the rear door closed, can protect and secure side doors in a secure, hidden location. The door storage system, when not storing doors, can provide a lockable and secure area for housing, for example, various tailgating accessories—grills, for example. The locating features described above can help to ensure that the user does not inadvertently forget to put the doors in the door storage area or back in an installed position on the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
a door storage system that is disposed within a cargo area of a vehicle, the door storage system moveable between a lowered position and an expanded position, the door storage system configured to accept at least one door of the vehicle within a door receiving area when the door storage system is in the expanded position, the at least one door including a first door and a second door; and
at least one spacer configured to be placed vertically between the first and second door when the first and second door are disposed within the door receiving area.

2. The vehicle assembly of claim 1, further comprising an upper platform of the door storage system, the upper platform vertically higher when the door storage system is in the expanded position than when the door storage system is in the lowered position.

3. The vehicle assembly of claim 2, wherein the upper platform of the door storage system is vertically beneath a beltline of the vehicle when the door storage system is in the expanded position.

4. The vehicle assembly of claim 2, wherein the door receiving area is vertically beneath the upper platform when the door storage system is in the expanded position.

5. The vehicle assembly of claim 2, further comprising at least one support panel of the door storage system, the at least one support panel pivotable between a stowed position and a flipped position, the at least one support panel providing a lateral side of the door storage system when the door storage system is in the flipped position.

6. The vehicle assembly of claim 5, wherein the at least one support panel includes a hinged side and a support side that is opposite the hinged side, the support side supporting the upper platform when the door storage system is in the expanded position.

7. The vehicle assembly of claim 1, further comprising a floor of the door storage system, the floor having a profile mimicking a profile of a side of the first door.

8. The vehicle assembly of claim 1, further comprising at least one support panel of the door storage system, the at least one support panel pivotable between a stowed position and a flipped position, the at least one support panel providing a lateral side of the door storage system when the door storage system is in the flipped position, the at least one spacer pivotably connected to the at least one support panel.

9. The vehicle assembly of claim 1, wherein the at least one door is at least one side door of the vehicle.

10. The vehicle assembly of claim 1, wherein the vehicle comprises no more than two side doors.

11. The vehicle assembly of claim 1, wherein the first door is a first side door and the second door is a second side door, wherein the first side door and the second side door that are disposed on an inboard or outboard side and are stacked vertically atop one another.

12. The vehicle assembly of claim 11, wherein the first side door and the second side door each include a locator configured to communicate with a communication module on the vehicle when the respective first or second side door is decoupled from the vehicle.

13. A vehicle assembly, comprising:
a door storage system that is disposed within a cargo area of a vehicle, the door storage system moveable between a lowered position and an expanded position, the door storage system configured to accept at least one door of the vehicle within a door receiving area when the door storage system is in the expanded position, wherein the door storage system is slidable between a stowed position and a loading position, a rear door of the vehicle can close when door storage system is in the stowed position, the door storage system extended at least partially rearward of the rear bumper when in the loading position.

14. The vehicle assembly of claim 13, wherein the door storage system includes an upper platform, a floor, a driver side support panel pivotably secured to the floor, and a passenger side support panel pivotably secured to the floor, wherein the upper platform, floor, driver and passenger side support panels are slidable together between the stowed position and the loading position.

15. The vehicle assembly of claim 13, wherein the upper platform includes at least one recessed area configured to receive a traction device.

16. A method of removing and storing a door of a vehicle, comprising:
transitioning a door storage system of a vehicle from a lowered position to an expanded position;
loading at least one door within a door receiving area of the door storage system when the door storage system is in the expanded position; and
prior to the loading, sliding the door storage system from a stowed position to a loading position, and loading the at least one door when the door storage system is in the loading position.

17. The method of claim 16, further comprising stacking a first side door atop a second side door during the loading, and separating the first side door from the second side door using at least one spacer.

18. The method of claim 16, further comprising, after the loading, covering the at least one door with an upper platform of the door storage system.

* * * * *

UNITED STATES PATENT AND TRADEMARK OFFICE
CERTIFICATE OF CORRECTION

PATENT NO. : 11,377,038 B2
APPLICATION NO. : 17/021749
DATED : July 5, 2022
INVENTOR(S) : Stuart C. Salter et al.

It is certified that error appears in the above-identified patent and that said Letters Patent is hereby corrected as shown below:

In the Claims

In Claim 13, Column 9, Line 24; replace "when door storage system" with --when the door storage system--

In Claim 13, Column 9, Line 26; replace "the rear bumper" with --a rear bumper--

In Claim 15, Column 10, Line 6; replace "claim 13" with --claim 14--

Signed and Sealed this
Twentieth Day of September, 2022

Katherine Kelly Vidal
*Director of the United States Patent and Trademark Office*